Jan. 17, 1939. C. G. ELLIS 2,144,182
FOOD PRODUCT PREPARING MACHINE
Filed Jan. 11, 1937 3 Sheets-Sheet 3
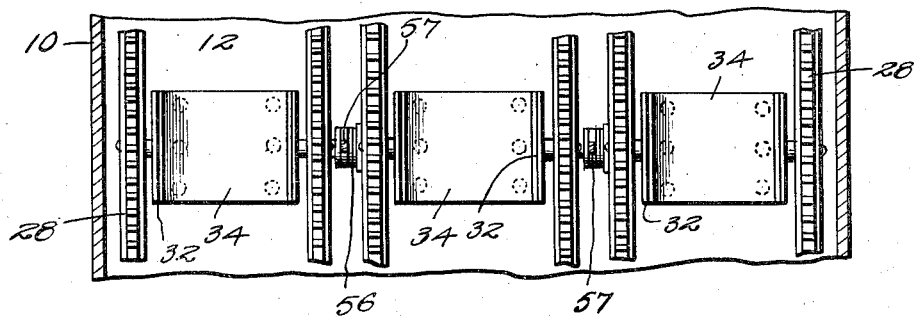
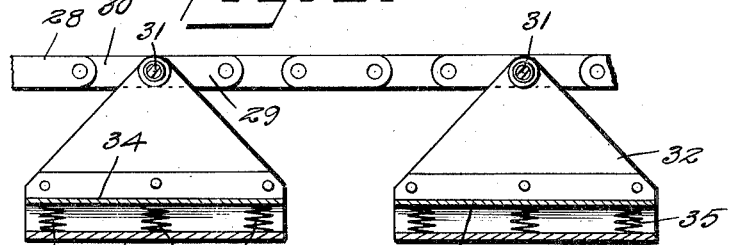
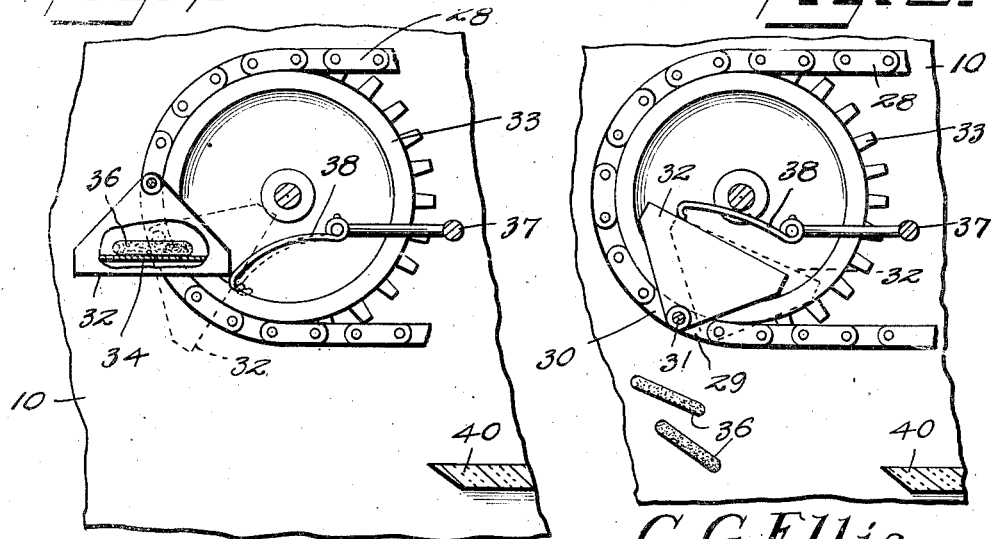
C. G. Ellis
INVENTOR
BY Victor J. Evans & Co.
ATTORNEY Patented Jan. 17, 1939

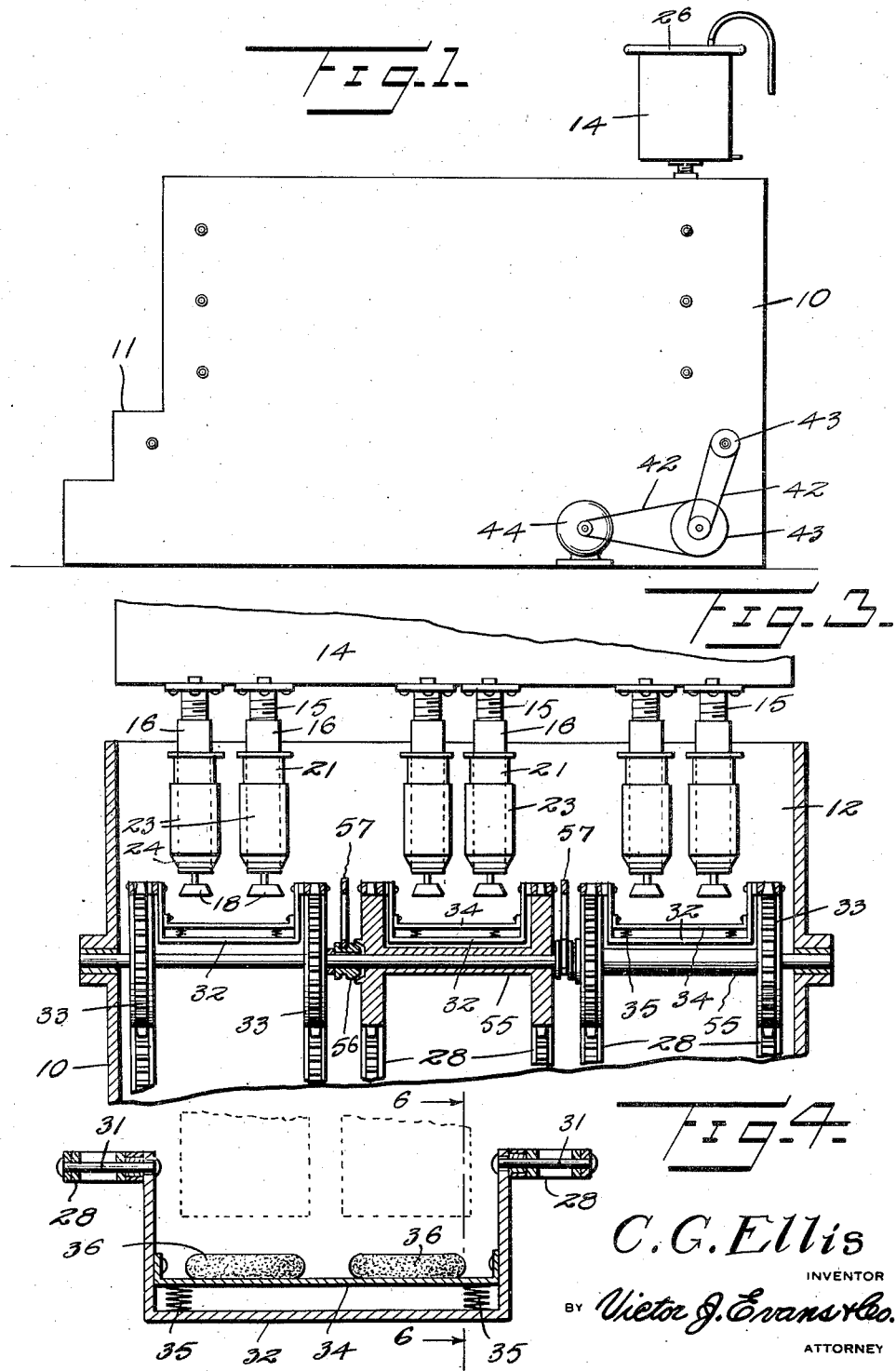

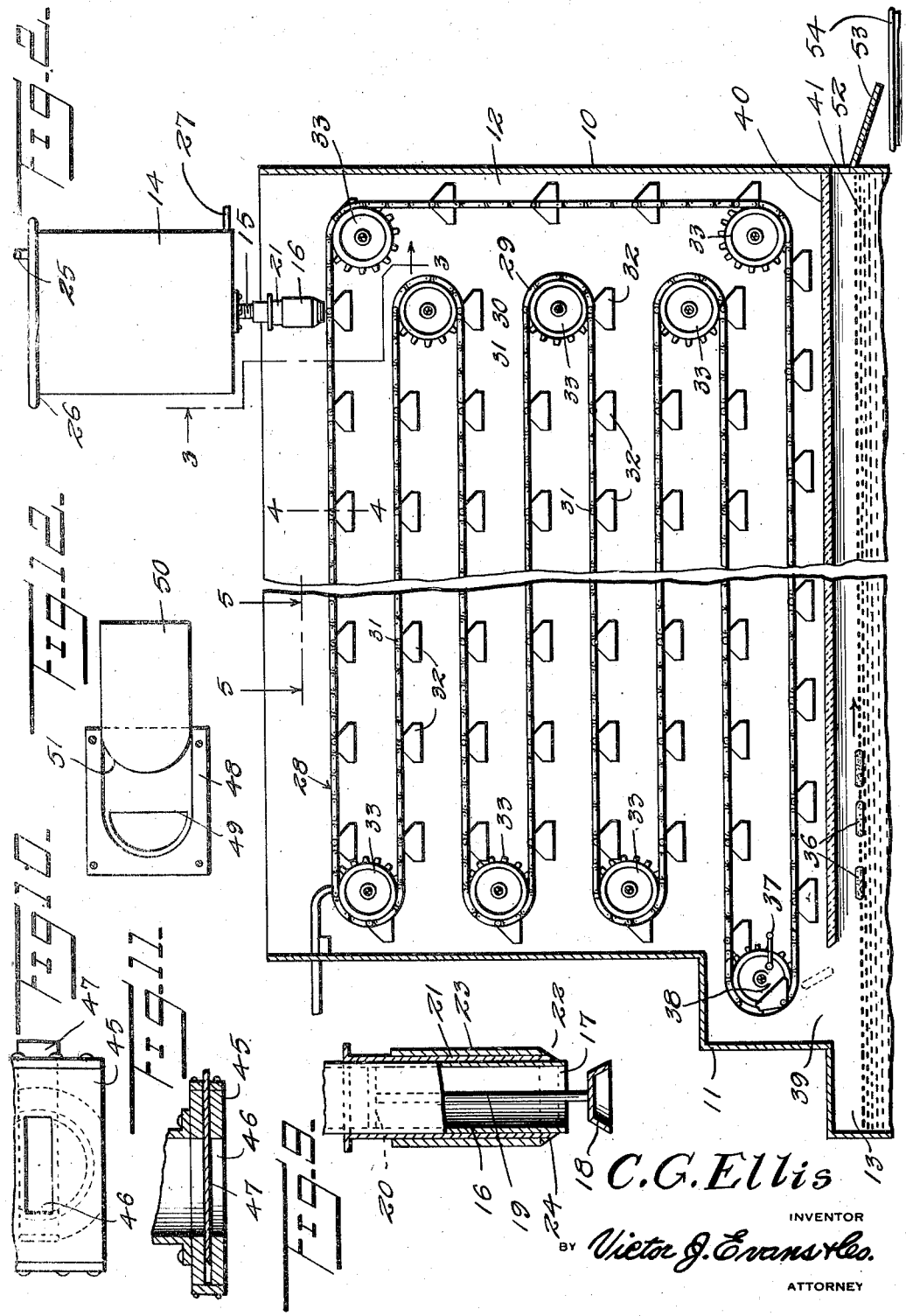

2,144,182

UNITED STATES PATENT OFFICE 2,144,182

FOOD PRODUCT PREPARING MACHINE

Carl George Ellis, Kokomo, Ind.

Application January 11, 1937, Serial No. 120,123

1 Claim. (Cl. 53—7)

The invention relates to a food product preparing machine and more especially to a doughnut machine.

The primary object of the invention is the provision of a machine of this character, wherein the food product which is yeast-bearing dough will be mechanically handled and in this way avoiding the handling of the product in its preparation by hand which results in or tends to toughen the dough.

Another object of the invention is the provision of a machine of this character, wherein the preparation of a food product, such, for example, as doughnuts, which is formed from dough that needs to proof or rise before cooking will be had, the product being of the highest quality and is assured of lightness and thorough cooking when delivered from the apparatus being relieved of toughness and properly proofed.

A further object of the invention is the provision of an apparatus of this character, which is comparatively simple in construction, thoroughly reliable and efficient in operation, having a maximum capacity, automatically actuated, and enabling economical and satisfactory production of the food products and also comparatively inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a side elevation of the apparatus constructed in accordance with the invention.

Figure 2 is a vertical longitudinal sectional view thereof.

Figure 3 is an enlarged fragmentary sectional view taken on the line 3—3 of Figure 2.

Figure 4 is a fragmentary enlarged transverse sectional view approximately on the line 4—4 of Figure 2 taken through one of the conveyors with doughnut formations in place.

Figure 5 is a fragmentary sectional view on the line 5—5 of Figure 2.

Figure 6 is a fragmentary vertical longitudinal sectional view through one of the conveyors taken approximately on the line 6—6 of Figure 4 looking in the direction of the arrows.

Figure 7 is a fragmentary enlarged vertical longitudinal sectional view showing in detail a trip for the carriers of the conveyor.

Figure 8 is a view similar to Figure 7 showing the carrier tripped and in dumping position.

Figure 9 is a fragmentary side elevation partly in section of the dough forming and cutting head.

Figure 10 is a fragmentary detail view of a slight modification.

Figure 11 is a vertical sectional view thereof.

Figure 12 is a horizontal sectional view showing a further modification.

Similar reference characters indicate corresponding parts throughout the several views in the drawings.

Referring to the drawings in detail, the apparatus comprises a casing 10 having a stepped formation at 11 at one end and interiorly of this casing is an upper conveyor chamber 12 and a lower hot grease trough 13, respectively, while suitably supported above the top of the casing at a feed locality with respect thereto is a container or holder 14 in which dough may be placed. It is preferable to use dough containing yeast and this apparatus is designed to make possible the use of yeast-containing dough in an automatic manner.

Arranged at the bottom of the container or holder 14 and in communication therewith is a depending dispensing nipple 15 with which is detachably connected a combined dough product forming and cutting head, in this instance includes a feed tube 16 having spaced below its lower discharge end 17 a centered hole making die 18 which in this instance is of hollow truncated conical form having a suspension stem 19 connected to a cross strap-like spider 20 fixed within the tube 16. Slidable on the tube 16 is a cylindrical cutter 21 having an outer beveled knife edge 22 while externally upon the said cutter is an ejector and spreader sleeve 23, it having the beveled lower edge 24 corresponding to the knife edge 22, the cylindrical cutter 21 being actuated for sliding movement toward and away from the die 18 and the purpose thereof is to sever the dough fed from the container or holder 14 when discharged through the tube 16 while the ejector or spreader, which is preferably made from rubber, disperses the cut dough from the die 18 and mechanically spreads such dough when so dispersed thus in this manner a center holed doughnut is formed.

The container or holder 14 is provided with a supply of compressed air by means of a pipe 25 which is shown fragmentarily and entering through a suitable cover 26 for the said holder or container but it may obviously be connected at any desirable point. This pipe 25 is assumed to be connected by a suitable means or otherwise to a source of compressed air thus supplying means of forcing the dough out of the container or holder in the operation of the apparatus. At the point of communication of the nipple 15 with the container or holder 14 is a cut-off gate. or valve (not shown), the handle thereof being indicated at 27 for the control of the supply of dough fed from the said container or holder and such valve is manually operated in this instance.

Located within the casing 10 and working within the chamber 12 is a conveyor which may be constructed in any desirable manner. For purpose of illustration, this conveyor is shown composed of a series of parallel chains 28 formed of a series of link members, as, for example, 29 and 30 pivoted at their ends to pivots 31. The pivots 31 are attached to swinging carriers 32, these being arranged at spaced intervals throughout the extent of the said chains 28, each conveyor including a pair of spaced chains and a series of the carriers. Each carrier is interposed in the respective conveyors traveling immediately below the arranged heads depending from the container or holder 14 and receives dough as it is cut off and falls from the said heads.

The conveyors may be arranged to travel in any of the well known ways and for the purpose of illustration the same are shown passing over a series of sprocket wheels 33 so arranged that the conveyors travel a zigzag course making a series of back and forth passes or runs, making a lowermost delivery run above the grease trough 13 as well as several proofing runs within the chamber 12. The conveyors are operated in unison and any suitable source of power may be employed for driving such conveyors.

Each carrier 32 has arranged therein a spring tensioned rest canvas 34, the springs being indicated at 35 and the canvas is disposed crosswise within each carrier and made secure at its end in any desirable manner. This canvas rest 34 supports the dropped dough cut off and falling from the heads as indicated at 36.

Arranged at the delivery run of the conveyors and bracketed in any desirable manner at 37 is a spring carrier-trip 38 which functions to successively flop over singly the carriers 32 when the conveyors are operating for the discharge of the dough therefrom and delivery of the same through a space 39 created at the stepped end 11 of the casing 10 through the instrumentality of an asbestos covering sheet or plate 40 overhanging the trough 13, which latter contains hot grease 41.

The conveyors in this instance are driven from chain and sprocket connections 42 and 43 with an electric motor 44.

In Figures 10 and 11 of the drawings there is shown a slight modification wherein the same involves a head 45 having an elongated mouth 46 intersected by a sliding cutter 47 and this head is to be substituted for the head used in the preparation of doughnuts so that lunch sticks may be prepared in the machine as a product.

In Figure 12 of the drawings there is shown a further modification wherein there is involved a head 48 having a whole circular mouth 49 cooperating with a cutter 50 having a whole circular cutting end 51 for use in the making of whole rolls, better known as jelly doughnuts, and this head 48 is in substitute for the doughnut making head or the lunch stick making head before described.

In the operation of the apparatus the speed of travel of the conveyors may be controlled for varying the length of time that the dough is proofed within the chamber 12 before the doughnuts or other food products prepared within the machine are baked. Also by reason of the extent of the grease trough 13 there is means for varying the length of time that the products are cooked, such products being floated on the grease 41 within the trough 13 during the final cooking stage and are removed therefrom through an exit 52 and dispensed from a chute 53 onto a receiver 54.

The liquid grease 41 within the trough 13 is maintained at the desired temperature in any desirable manner, preferably through the use of a heater (not shown).

The doughs containing yeast conveyed by the carriers of the conveyors will be transported within the chamber 12 for the proper time interval for permitting the yeast to rise, making a porous spongy dough before the same is transferred from the carriers in successive order into the trough 13 and in this manner proper proofing of the doughs will be had. Such doughs when upon the rests 34 in the carriers 32 will be relieved from vibration due to the spring mounting of said rests. With this apparatus it is possible after the dough has been subjected to the continually but gradually increasing temperature thus giving the yeast a chance to develop to plunge the developed dough into the grease 41 in the trough 13, first exposing one side to the cooking operation and then automatically inverting the dough and subjecting the other side to the cooking operation when in the grease 41. The cooked product may then be removed from the grease 41 as before stated.

It will be evident, therefore, that the apparatus involves a continuous cycle for making food products as well as an automatic machine for carrying out such cycle.

The apparatus is so constructed that the food products are cut and dropped onto rests in carriers which are moved by the conveyors and these conveyors moving in different planes or superposed runs gradually approach the grease trough 13. They will become properly proofed, firm and shapely. When each product comes to the end of the delivery run of the conveyors, it is tripped quickly and dropped into grease where such product becomes cooked or fried. The carriers do not enter the hot grease, which, should it be the case, they would tend to grease the entire travel of the products causing the latter to stick to the rests in the carriers and at the same time the grease would cause a film of oil to fully cover such conveyors and carriers and this film would stick to the product and have to be scraped off at the end of the travel of the same. Further, the yeast would have a reaction on the grease especially if it was not hot and the dough would have a tendency to absorb a portion of the grease and as a result the dough would not rise so that the product would become flat. The apparatus hereinbefore described overcomes these objections and results in a perfectly formed proofed and fried product.

The proofed product is automatically dropped into the grease trough 13 so that such product will float the grease therein which effects the final period of such product, the carriers for the grease being at no time subjected to the quantity of liquid grease contained within the trough 13 as such carriers do not travel within this grease throughout the final run of the conveyors.

The warming of the chamber 12 can be effected in any desirable manner.

Coacting with the hubs 55 of those sprockets 33 constituting the motivating mediums for the conveyors are suitable clutches 56, these being hand controlled at 57 so that the conveyors can be started and stopped at the will of the operator of the apparatus, the driving power being had from the motor 44.

What is claimed is:

An apparatus for producing food products from dough containing yeast comprising a casing forming a proofing chamber, a hot grease containing trough below the same and communicative therewith next to one end through its bottom, means for conveying pieces of dough through said proofing chamber above the said trough, means for successively releasing only at the end of the proofing travel of the dough within said chamber from the said means for the dropping of the dough into the trough and grease therein at the point of communication of said chamber and trough, and tensioned fabric rests included in said first-named means for the pieces of dough.

CARL GEORGE ELLIS.